March 27, 1962      C. R. NELSON      3,026,613
DEHORNER
Filed March 31, 1961
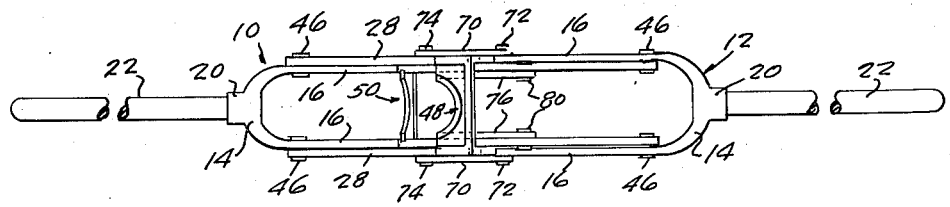
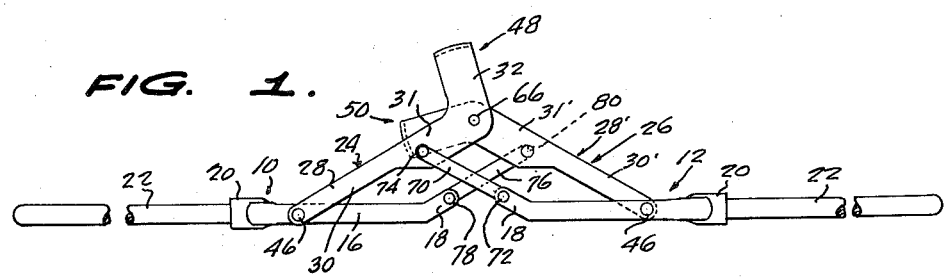
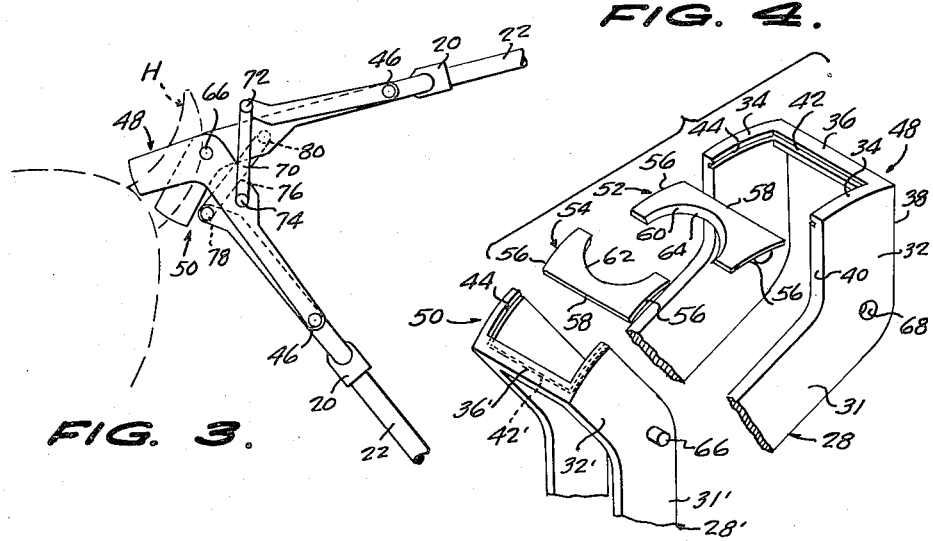
INVENTOR.
CARL R. NELSON,
BY
McMorrow, Berman & Davidson
ATTORNEYS.

United States Patent Office

3,026,613
Patented Mar. 27, 1962

3,026,613
DEHORNER
Carl R. Nelson, 3344 Summit St., Kansas City, Mo.
Filed Mar. 31, 1961, Ser. No. 99,941
7 Claims. (Cl. 30—245)

This invention relates to improvements in cutters employing shearing blades, and more particularly to a novel and improved dehorner for animal horns, which constitutes an improvement over the subject matter of my prior Patent No. 2,360,441, issued October 17, 1944.

The primary object of the present invention is the provision of a more efficient device of the kind indicated, which requires less effort on the part of the operator thereof, and which affords a less obstructed view, whereby the operator is enabled, following a first operation of removal of a horn, to more easily and accurately work upon the remaining stub and produce a natural polled appearance.

Another object of the invention is the provision, in a device of the character indicated above of more massive and rigid jaws, without an increase in the overall sizes thereof, in conjunction with narrower shearing blades removably engaged therein, whereby stability and the shearing action of the blades are improved.

A further object of the invention is the provision, in a device of the character indicated above, of removable and interchangeable handle bars, in an arrangement which enables using short or long handle bars, and removal of the bars, for compact storage and transportation of the device.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a device of the present invention, in fully opened position;

FIGURE 2 is a top plan view of FIGURE 1;

FIGURE 3 is a schematic view showing the device in fragmentary side elevation and applied to an animal horn in partially closed position, the horn and a part of an animal head being shown in phantom lines; and, FIGURE 4 is an enlarged, fragmentary and exploded perspective detail of the jaws and associated blades of the device.

Referring in detail to the drawings, wherein like numerals designate like parts throughout the several views, the illustrated device comprises a pair of first and second longitudinally opposed elongated U-shaped levers 10 and 12 having in common, arcuate bight portions 14 and straight flat parallel spaced legs 16. The legs 16 terminate, at their free inward ends, in obtusing and laterally angled terminals 18. The bight portions 14 have thereon fixed central sockets 20 which extend longitudinally outwardly therefrom, and receive the inner ends of removable handle bars 22, which are preferably in the form of straight round bars.

As shown in FIGURE 2, the levers 10 and 12, in the fully open position of the device, are coplanar and are in longitudinally spaced relationship, and their terminals 18 are located on the same sides of the levers and are in slight longitudinally spaced relationship. Crossed and pivotally connected outer and inner or first and second jaw members 24 and 26 are individually articulated to the levers 10 and 12, respectively.

The outer jaw member 24 comprises a pair of straight parallel spaced arms 28, which include relatively narrow outer portions 30, and wider inner portions 31, which reach out beyond the edges of the outer portions 30, which face the lever 10, the wider inner portions 31 having projecting beyond their edges remote from the lever 10, parallel spaced side plates 32, of substantially the same width as the portions 31. The side plates 32 are disposed at angles of about 45° to the lengths of the arms 28, and have slightly curved convex outer edges 34. The side plates 32 are spaced and connected by a relatively narrow cross bar 36 which is located at the trailing edges 38 of the side plates and is spaced, at a distance greater than its width, from the leading edges 40 of the side plates, as shown in FIGURE 4. The leading side of the bar 36 is provided with a centered longitudinal groove 42 which opens, at its ends, to the adjacent ends of grooves 44, provided in the inner surfaces of the side plates 32, near their outer edges 34, and have the same longitudinal curvatures as the edges 34.

The arms 28 of the outer jaw member 24 extend along the outer sides of the legs 16 of the first lever 10 and are pivoted thereto, at their free ends, as indicated at 46, at locations adjacent to its bight portion 20.

The inner jaw member 26 is narrower than the outer jaw member 24, so as to occupy a position within the legs 16 of the second lever 12. The inner jaw member 26 is otherwise similar to the outer jaw member 24, except that its side plates 32′ are oppositely angled to the side plates 32 of the outer jaw member 24, and the side plates 32′ are less widely spaced from each other, so as to engage between the side plates 32 of the outer jaw member 24, when the jaw members are in partially closed position, as shown in FIGURE 3.

The inner jaw member 26 has arms 28′, including narrow portions 30′ and wider portions 31′, and has a cross bar 36′, similar to the corresponding components of the outer jaw member 24, including blade accommodating slots 42′ and 44′.

The side plates, and cross bars of the jaw members 24 and 26 constitute first and second opposed jaws 48 and 50, respectively, which, when in their fully opened positions, are disposed at right angles to each other, as shown in FIGURE 1. Similar relatively thin and narrow shearing blades 52 and 54 are removably engaged in the slots of the jaws 48 and 50. The blades 52 and 54 are similar rectangular plates having ends 56 to engage in the side plate slots 44, 44′, and back or trailing edges 58 to engage in the cross bar slots 42 and 42′. The leading edges of the blades are centrally formed with semi-circular notches 60 and 62, respectively, whose edges are bevelled to define shearing edges 64 which are adapted to cut through opposite sides of an animal horn H, when the jaws 48 and 50 are forced toward each other. The blades are sufficiently staggered in the jaws 48 and 50, so that they can pass each other, while slidably engaged with each other, in order to achieve complete severance of the horn H.

The outer and inner jaw members 24 and 26 are crossed and pivoted together, at the corners defined by the meetings of their side plates with their arms. In order to free the spaces between the jaw plates of encumbrances, such as result from the presence therein of bolt shanks and/or heads and nuts, and thereby make the work more easily and completely visible, through these spaces, and in order to render the jaws 48 and 50 easier to clean, the jaws are pivoted together by means of external pins 66 on the opposite sides of the inner jaw 50 which are engaged in pivot holes 68, provided in the side plates of the outer jaw 48, as indicated in FIGURE 4.

The outer and inner jaw assemblies 24 and 26 are severally articulated to the second and first levers 12 and 10, respectively. Straight outer or first links 70 are externally pivoted, at one end, as indicated at 72, to the free ends of the terminals 18 of the second lever 12, and at their other ends, as indicated at 74, to the wider portions 31 of the arms 28 of the outer jaw member 24, at points near the narrow end portions thereof. Straight inner or second links 76 are pivoted, at one end, to the free ends of the terminals 18 of the legs of the first lever 10, as indicated at 78, and at their other ends to the wider portions 31' of the arms 28' of the inner jaw member 26, as indicated at 80, at points near their narrower portions 30'.

Although there has been shown and described a preferred form of the invention it is to be understood that the invention is not necessarily confined thereto, and that any change or changes in the structure of and in the relative arrangements of components thereof are contemplated as being within the scope of the invention as defined by the claims appended hereto.

What is claimed is:

1. A dehorner comprising opposed longitudinally elongated first and second levers having outer and inner ends, longitudinal handle bars secured on the outer ends of the levers, the inner ends of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the second lever, first link means pivoted at one end of the inner end of the second lever and at its other end to the arm means of the first jaw member at a point intermediate the ends thereof, second link means pivoted at one end to the inner end of the first lever and at its other end to the arm means of the second jaw members at a point intermediate the ends thereof, the arm means of the first and second jaw members being crossed and pivoted together at their inner ends, and first and second jaws fixed on the inner ends of related arm means and angled laterally relative to the arm means, said jaws having outer ends carrying blades in shearing relation to each other, jaws comprising parallel spaced side plates and cross bars fixed to and extending between the side plates at their trailing edges, the side plates of the first jaw being more widely spaced than the side plates of the second jaw and providing for entrance of the second jaw between the side plates of the first jaw in a closed relationship of the jaws.

2. A dehorner comprising opposed longitudinally elongated first and second levers having outer and inner ends, longitudinal handle bars secured on the outer ends of the levers, the inner ends of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the second lever, first link means pivoted at one end of the inner end of the second lever and at its other end to the arm means of the first jaw member at a point intermediate the ends thereof, second link means pivoted at one end to the inner end of the first lever and at its other end to the arm means of the second jaw members at a point intermediate the ends thereof, the arm means of the first and second jaw members being crossed and pivoted together at their inner ends, and first and second jaws fixed on the inner ends of related arm means and angled laterally relative to the arm means, said jaws having outer ends carrying blades in shearing relation to each other, jaws comprising parallel spaced side plates and cross bars fixed to and extending between the side plates at their trailing edges, the side plates of the first jaw being more widely spaced than the side plates of the second jaw and providing for entrance of the second jaw between the side plates of the first jaw in a closed relationship of the jaws, the outer plates of the jaws having outer ends, the cross bars being relatively narrow and relatively greatly spaced from the leading edges of the jaw plates and located at the outer edges of the side plates, said blades being located between the side plates of the jaws and removably engaged with the side plates and the cross bars.

3. A dehorner comprising opposed longitudinally elongated first and second levers having outer and inner ends, longitudinal handle bars secured on the outer ends of the levers, the inner ends of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the second lever, first link means pivoted at one end of the inner end of the second lever and at its other end to the arm means of the first jaw member at a point intermediate the ends thereof, second link means pivoted at one end to the inner end of the first lever and at its other end to the arm means of the second jaw members at a point intermediate the ends thereof, the arm means of the first and second jaw members being crossed and pivoted together at their inner ends, and first and second jaws fixed on the inner ends of related arm means and angled laterally relative to the arm means, said jaws having outer ends carrying blades in shearing relation to each other, jaws comprising parallel spaced side plates and cross bars fixed to and extending between the side plates at their trailing edges, the side plates of the first jaw being more widely spaced than the side plates of the second jaw and providing for entrance of the second jaw between the side plates of the first jaw in a closed relationship of the jaws, the outer plates of the jaws having outer ends, the cross bars being relatively narrow and relatively greatly spaced from the leading edges of the jaw plates and located at the outer edges of the side plates, said blades being located between the side plates of the jaws and removably engaged with the side plates and the cross bars, the blades being parallel to and close to the outer edges of the side plates.

4. A dehorner comprising opposed longitudinally elongated first and second levers having outer and inner ends, longitudinal handle bars secured on the outer ends of the levers, the inner ends of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the second lever, first link means pivoted at one end of the inner end of the second lever and at its other end to the arm means of the first jaw member at a point intermediate the ends thereof, second link means pivoted at one end to the inner end of the first lever and at its other end to the arm means of the second jaw members at a point intermediate the ends thereof, the arm means of the first and second jaw members being crossed and pivoted together at their inner ends, and first and second jaws fixed on the inner ends of related arm means and angled laterally relative to the arm means, said jaws having outer ends carrying blades in shearing relation to each other, jaws comprising parallel spaced side plates and cross bars fixed to and extending between the side plates at their trailing edges, the side plates of the first jaw being more widely spaced than the side plates of the second jaw and providing for entrance of the second jaw between the side plates of the first jaw in a closed relationship of the jaws, the outer plates of the jaws having outer ends, the cross bars being relatively narrow and relatively greatly spaced from the leading edges of the jaw plates and located at the outer edges of the side plates, said blades being located between the side plates of the jaws and removably engaged with the side plates and the cross bars, the blades being parallel to and close to the outer edges of the side plates, said blades being rectangular plates having ends and trailing and leading edges, the leading edges being formed with edged semi-circular notches, the inner surfaces of the side plates having first grooves receiving the ends of the blade plates and the cross bars having second grooves receiving the trailing edges of the blade plates, the blade plates being in different but adjacent planes.

5. A dehorner comprising opposed longitudinally elongated first and second levers having outer and inner ends, longitudinal handle bars secured on the outer ends of the levers, the inner ends of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the second lever, first link means pivoted at one end of the inner end of the second lever and at its other end to the arm means of the first jaw member at a point intermediate the ends thereof, second link means pivoted at one end to the inner end of the first lever and at its other end to the arm means of the second jaw members at a point intermediate the ends thereof, the arm means of the first and second jaw members being crossed and pivoted together at their inner ends, and first and second jaws fixed on the inner ends of related arm means and angled laterally relative to the arm means, said jaws having outer ends carrying blades in shearing relation to each other, jaws comprising parallel spaced side plates and cross bars fixed to and extending between the side plates at their trailing edges, the side plates of the first jaw being more widely spaced than the side plates of the second jaw and providing for entrance of the second jaw between the side plates of the first jaw in a closed relationship of the jaws, the outer plates of the jaws having outer ends, the cross bars being relatively narrow and relatively greatly spaced from the leading edges of the jaw plates and located at the outer edges of the side plates, said blades being located between the side plates of the jaws and removably engaged with the side plates and the cross bars, and means pivoting the jaw assembly legs together comprising external pivot pins on the side plates of the second jaw member and pivot holes in the side plates of the first jaw member on which the pivot pins are journalled.

6. A dehorner comprising opposed longitudinally elongated first and second levers having outer and inner ends, longitudinal handle bars secured on the outer ends of the levers, the inner ends of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the second lever, first link means pivoted at one end of the inner end of the second lever and at its other end to the arm means of the first jaw member at a point intermediate the ends thereof, second link means pivoted at one end to the inner end of the first lever and at its other end to the arm means of the second jaw members at a point intermediate the ends thereof, the arm means of the first and second jaw members being crossed and pivoted together at their inner ends, and first and second jaws fixed on the inner ends of related arm means and angled laterally relative to the arm means, said jaws having outer ends carrying blades in shearing relation to each other, jaws comprising parallel spaced side plates and cross bars fixed to and extending between the side plates at their trailing edges, the side plates of the first jaw being more widely spaced than the side plates of the second jaw and providing for entrance of the second jaw between the side plates of the first jaw in a closed relationship of the jaws, the outer plates of the jaws having outer ends, the cross bars being relatively narrow and relatively greatly spaced from the leading edges of the jaw plates and located at the outer edges of the side plates, said blades being located between the side plates of the jaws and removably engaged with the side plates and the cross bars, the blades being parallel to and close to the outer edges of the side plates, said first and second levers being U-shaped and comprising bight portions at their outer ends and spaced parallel inwardly extending legs having laterally offset terminals on their inner ends to which related ends of related links are pivoted, said arm means comprising parallel spaced arms having outer ends pivoted to the legs of related levers, the side plates being fixed to related arms.

7. A dehorner comprising opposed longitudinally elongated first and second levers having outer and inner ends, longitudinal handle bars secured on the outer ends of the levers, the inner ends of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the levers being spaced from each other, a first jaw member having arm means having an outer end pivoted to said first lever at a point spaced outwardly from the inner end of the first lever, a second jaw member having arm means having an outer end pivoted to the second lever at a point spaced from the inner end of the second lever, first link means pivoted at one end of the inner end of the second lever and at its other end to the arm means of the first jaw member at a point intermediate the ends thereof, second link means pivoted at one end to the inner end of the first lever and at its other end to the arm means of the second jaw members at a point intermediate the ends thereof, the arm means of the first and second jaw members being crossed and pivoted together at their inner ends, and first and second jaws fixed on the inner ends of related arm means and angled laterally relative to the arm means, said jaws having outer ends carrying blades in shearing relation to each other, jaws comprising parallel spaced side plates and cross bars fixed to and extending between the side plates at their trailing edges, the side plates of the first jaw being more widely spaced than the side plates of the second jaw and providing for entrance of the second jaw between the side plates of the first jaw in a closed relationship of the jaws, the outer plates of the jaws having outer ends, the cross bars being relatively narrow and relatively greatly spaced from the leading edges of the jaw plates and located between the side plates of the jaws and removably engaged with the side plates and the cross bars, the blades being parallel to and close to the outer edges of the side plates, said first and second levers being U-shaped and comprising bight portions at their outer ends and spaced parallel inwardly extending legs having laterally offset terminals on their inner ends to which related ends of related links are pivoted, said arm means comprising parallel spaced arms having outer ends pivoted to the legs of related levers, the side plates being fixed to related arms, said bight portions having longitudinally outwardly extending sockets fixed thereon, said handle bars having inner ends removably engaged in the sockets.

References Cited in the file of this patent
UNITED STATES PATENTS
2,360,441     Nelson _____ Oct. 17, 1941